(12) United States Patent
Simms et al.

(10) Patent No.: US 6,839,212 B2
(45) Date of Patent: Jan. 4, 2005

(54) BUS BAR THERMAL DETECTION

(75) Inventors: Kevin Anthony Simms, Houston, PA (US); Wayne Gerald Adamson, Coraopolis, PA (US); Thomas Michael Doring, Powell, OH (US)

(73) Assignee: Eaton Corporation, Cleveland, OH (US)

(*) Notice: Subject to any disclaimer, the term of this patent is extended or adjusted under 35 U.S.C. 154(b) by 331 days.

(21) Appl. No.: 09/881,387

(22) Filed: Jun. 13, 2001

(65) Prior Publication Data

US 2002/0191362 A1 Dec. 19, 2002

(51) Int. Cl.[7] .............................................. H02H 5/04
(52) U.S. Cl. ...................................... 361/103; 361/93.8
(58) Field of Search ............................ 361/103, 93.7, 361/93.8, 93.9, 105, 106, 611, 624, 648

(56) References Cited

U.S. PATENT DOCUMENTS

| 3,872,355 | A |   | 3/1975 | Klein et al. |
| 4,565,455 | A |   | 1/1986 | Bloore et al. |
| 4,929,092 | A | * | 5/1990 | Taguchi et al. ............. 374/183 |
| 5,319,356 | A | * | 6/1994 | Yoshino ..................... 340/584 |
| 5,606,483 | A | * | 2/1997 | Sawai et al. ................ 361/106 |
| 5,627,719 | A | * | 5/1997 | Gaston ....................... 361/103 |
| 6,052,268 | A | * | 4/2000 | Thomas ...................... 361/103 |
| 6,175,780 | B1 | * | 1/2001 | Engel ......................... 700/293 |

OTHER PUBLICATIONS

T.G. Beckwith et al., "*Mechanical Measures, Fifth Edition*", 1993, pp. 668–673, Addison–Wesley Publishing Company, US.

* cited by examiner

Primary Examiner—Stephen W. Jackson
Assistant Examiner—Danny Nguyen
(74) Attorney, Agent, or Firm—Martin J. Moran

(57) ABSTRACT

A thermal detection system (10) contains a plural pole circuit breaker (12) and a resistance temperature detector adhesive tape (22, 24) connected to an electric circuit (34) that detects the resistance change in the adhesive tape (22, 24), which in turn sends a signal to a shunt trip (40) connected to the circuit breaker (12).

1 Claim, 1 Drawing Sheet

BUS BAR THERMAL DETECTION

BACKGROUND OF THE INVENTION

1. Field of the Invention

This invention relates to identifying loose connections or faulty wiring that will cause a rise in temperature on the bus bars of a load center or panel board associated with a circuit breaker or plurality of circuit breakers.

2. Background Information

Oftentimes heat damage in or surrounding electrical distribution equipment is caused by failures in electrical wiring. Occasionally, bus bars get hot spots on them that are desirable to detect. Examples of patents relating to temperature sensors includes U.S. Pat. No. 3,872,355 (Klein, et al.) which is directed to an early warning fire detection system using conventional building electrical power distribution circuits; and U.S. Pat. No. 4,565,455 (Bloore, et al.) relating to a heat regulating system utilizing a temperature sensor tape associated with and controlling the temperature of a heating tape.

It is desired to detect and react to dangerous levels of excessive heat when origination occurs in the electrical distribution panel. What is needed is a simple means to recognize such faulty wiring or loose connections by identifying a rise in temperature on the bus bar or other electrical conductor where such problems occur. What is also needed is a system capable of detecting heat rises due to any fault before a fire breaks out or other damage occurs. Such a system should provide electrical signals that indicate such a problem and provide a detecting circuit connected to a circuit breaker which would switch off an individual circuit breaker or a main circuit breaker that feeds the electrical distribution panel after a preset voltage is reached.

SUMMARY OF THE INVENTION

Therefore, it is one of the main objects of this invention to provide a simple means to identify hot spots or other indications of faulty wiring or loose conductors on the electrical connections feeding out of circuit breakers.

It is also a main object of the invention to provide a system to monitor bus bar temperatures with a detecting circuit which will compare bus bar temperatures with a preset limit in order to trip the breakers at higher than normal bus bar temperatures.

These and other objects of the invention are accomplished by providing a thermal detection system comprising a plural pole circuit breaker, lead bus bars, and a resistance temperature detector adhesive tape connected to the bus bars and to an electronic circuit that detects the resistance change in the resistance temperature detector adhesive tape, which in turn sends a signal to a shunt trip connected to the circuit breaker. This invention is also accomplished by providing a thermal detection system comprising at least two uninsulated, metal, power supply bus bars having a predetermined current limit connected to a plural pole circuit breaker which contains a shunt trip module, where each bus bar is contacted along at least part of its length with a temperature reactive material such as a resistance temperature detector ("RTD") adhesive tape strip that reacts to changes in temperatures by changing its resistivity and where a heat detection measurement module is electrically connected to each RTD adhesive tape strip, and to the shunt trip module, where the heat detection module is preset to allow current to energize the shunt trip module and shut down the circuit breaker if the temperature anywhere along the bus bar adhesive tape strip contact points is measured by the heat detection measurement module to be greater than the present temperature limit. Preferably, the heat detection measurement module is an electrical bridge circuit that comprises three open resistors and a variable resistor preset switch with an associated voltage source. Other arrangements are also useful, as described later.

Preferably the shunt trip module is part of the main circuit breaker. This module will trip the main breaker when the control circuit monitors the RTD and commands the shunt trip to trip when the temperature detected caused by a high resistant joint that in-turn causes a temperature rise that is higher than a predetermined valve. A shunt trip module can be of internal or external module design. The module basically trips the breaker when the required voltage is sent to the module. The voltage energizes a coil and activates the tripping mechanism of the circuit breaker. Preferably the RTD adhesive tape strip contacts the bus bar near the main breaker.

This invention describes a protection system for a load center or electrical panel board that reacts to a temperature overload rather than a current overload. This system comprises of a temperature reactive material, RTD, that is attached to the panel's bus bars. A control module monitors the RTD. When the temperature of bus bar exceeds a predetermined temperature, the control module commands a shunt trip main breaker to shut off the circuit.

BRIEF DESCRIPTION OF THE DRAWINGS

There are shown in the drawings certain exemplary embodiments of the invention as presently preferred. It should be understood that the invention is not limited to the embodiments disclosed as examples and is capable of variation within the spirit and scope of the appended claims. In the drawings:

DETAILED DESCRIPTION OF THE PREFERRED EMBODIMENTS OF THE INVENTION

Figure 1:
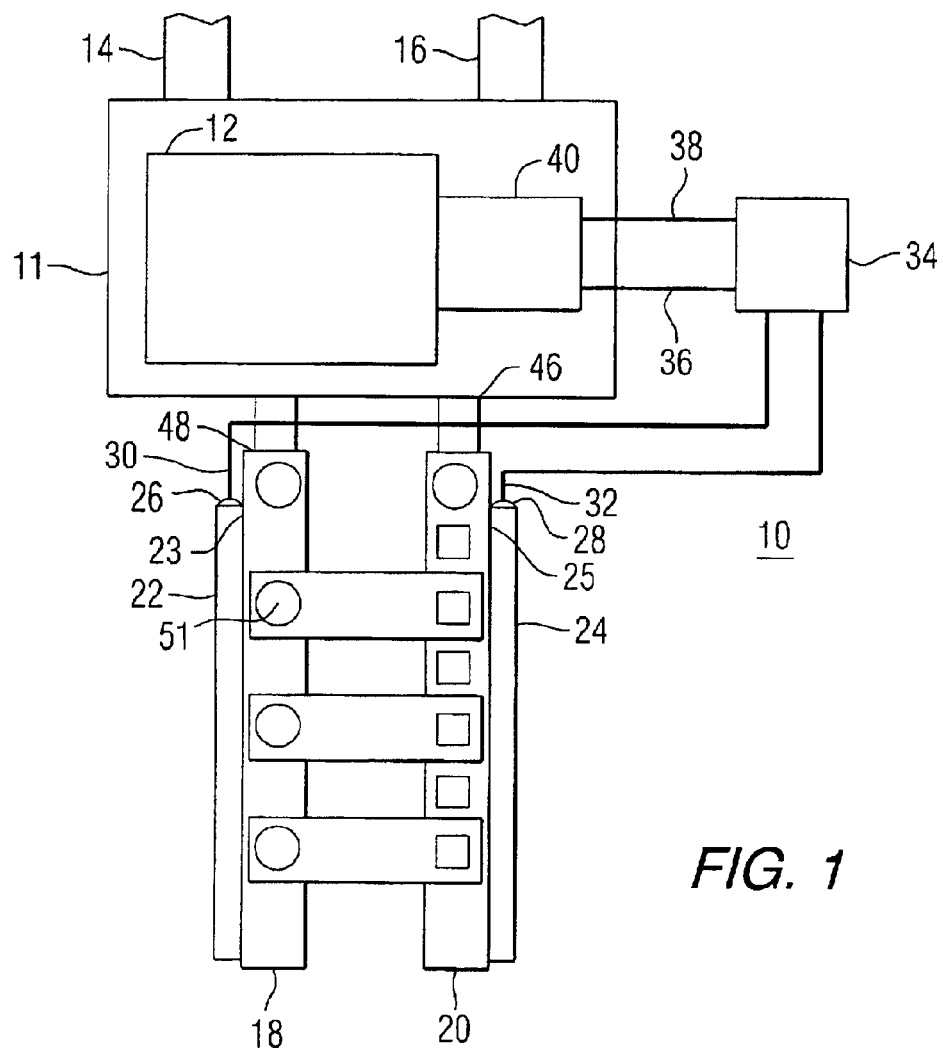
FIG. 1 shows a bus bar associated with a load center which includes a circuit breaker and a shunt trip module, where sensor wires connect a conductive adhesive tape contacting the bus bar to the shunt trip module, through a detecting circuit.

Referring now to FIG. 1, loadcenter 11 of an electrical power distribution system includes a main plural pole circuit breaker 12 with plural phase conductor, for example, 14 and 16 connected to a source of electricity (not shown). A plurality of main power supply bus bars associated with and feeding out of the main breaker are shown as 18 and 20. Connections of the plural phase conductors and bus bars internally within the loadcenter are not shown. Associated with the bus bars and circuit breaker is a thermal detection system 10 containing adhesive tape strips 22 and 24 and electronic circuit elements 34 and 40. Each bus bar has a contacting resistance temperature detector ("RTD") adhesive tape strip 22 and 24 along at least a part of its length, preferably along its entire length. It is more important, however, to have the tape close to the main breaker such as at points 23 and 25. These strips 22 and 24 conduct both heat and electric current. Each strip is connected at least one point 26 and 28 to conductors 30 and 32 which pass to a heat detection module 34, one example of which is shown in more detail in FIG. 2. Sensor wires or conductors 36 and 38 can connect the heat detection module 34 to a shunt trip module 40 associated with and connected to the circuit breaker 12. Shunt trips are normally mechanically attached.

The resistance temperature detector adhesive tape strips 22 and 24 mildly conduct electric current and heat at or about 10° C. to 15° C. above room temperature, with the bus bars operating normally. If, however, there is a loose connection at any point, for example, one or more of points 46, 48 or 50 causing a hot spot on one or more of the bus bars 18 and 20, then the resistivity of one or both tapes due to resistive Joule heating ($I^2R$), will dramatically increase, for example, by a factor of 5× ohms or higher, providing less current to the heat detection module 34.

The tape strips can comprise conductive material contacting a supporting adhesive substrate. They can comprise a porous backing or substrate of, for example, glass fiber cloth, woven carbon fiber cloth, woven Nylon-long chain synthetic polyamide having recurring amide groups, woven polyester-polyethylene terephthalate, and the like, coated with, on one or both sides, or impregnated with, a conductive filler material. The conductive filler can include fine particles of, for example, carbon black, graphite, or metal particles. These conductive filler particles can be dispersed in a fluid, resinous, thermally stable, coating or impregnating material, such as, for example, a thermoplastic polymer, elastomeric polymer or thermosetting polymer. The filled coating or impregnating material is characterized by a sharp increase in resistivity as its temperature rises above a particular value, known as the switching temperature. This type of coated or impregnated backing constituting the tape strip should not be fully cured so that it will be adhesive and adhere to the bus bars and so it will be easy to cut to size. Preferably the conductor filler will constitute at least 10 wt. % of the total tape weight, preferably from about 15 wt. % to 60 wt. % of the total tape weight. Epoxy resins, well known in the art, with carbon black would be a very suitable candidate for coating or impregnating.

The tape strips also could be a conductive metal-glass slurry or the like deposited on a ceramic substrate, an element such as platinum, rhodium-iron, copper or nickel encased by pyrex glass, ceramic, alumina-glass substrates, and the like.

Figure 2:
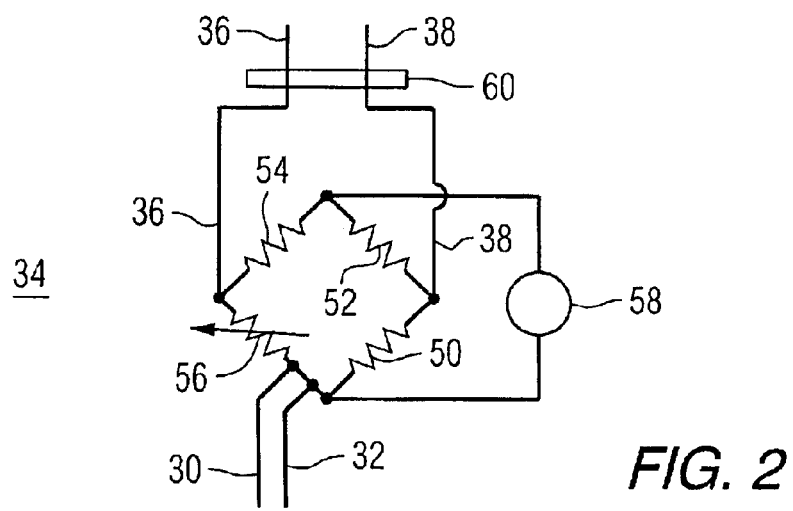
FIG. 2 shows one embodiment of a detecting circuit useful in this invention.

FIG. 2 illustrates one example of a suitable circuit that can be utilized as the heat detection module 34. This module can comprise, as shown, an electrical bridge circuit of open resistors 50, 52 and 54 and variable resistor 56, with a voltage source 58 connected across resistors 50 and 52. The wires 36 and 38 are connected across the resistors 52 and 54. Conductors 36 and 38 would feed the logic circuit 40 shown in FIG. 1. The logic circuit would read the voltage across 36 and 38. This voltage must not exceed a predetermined value set in the module based on a predetermined bus bar temperature limit. When it does exceed the value the heat detection module sends the required operating voltage to the shunt trip module 40.

The voltage source 58 to supply the module 34 could be supplied by the bus bars 18 and 20. The voltage source will apply a known voltage to the bridge when the tape(s), which are really resistance temperature detectors, heat up and become resistive, so that there will be change in the voltage of the sensor wires 36 and 38. This would activate a circuit board 60 to send a pulse of required voltage to activate the shunt trip module 40 to shut down the circuit breaker 12, when the voltage on the sensing wires 36 and 38 reaches a desired value. This desired voltage value would coordinate back to a bus bar temperature which would be at a dangerous value for the bus bar to operate at continually. More detailed information on other useful type electrical bridge circuitry, such as three, Callender and four lead circuitry is available, for example, in *Mechanical Measurements* 5$^{th}$ Ed. by T. G. Beckworth, et al., Chapter 16, "Thermoresistive Elements," pp. 668–673, Addison-Wesley pub. (1995).

A shunt trip module 40, as noted previously, can be an electromechanical device. The device is attached to the main breaker where a shunt trip coil, energized by conductors 36 and 38, is mechanically attached to and can energize a tripping mechanism within the main breaker.

The thermal tape strips 22 and 24 will detect a rise in temperature of the bus bars of the load center. When the shunt trip module recognizes that a bus bar temperature exceeds a predetermined limit, the main breaker 12 will be tripped and shut off. The heat detection module 34 utilizes a circuit to compare the actual bus bar temperature with a preset temperature limit regulated by variable resistor 56. If the bus bar temperature exceeds the preset limit the module circuit 34 will provide a signal to the shunt trip module 40 to trip the main breaker 12.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of invention which is to be given the full breadth of the claims appended and any and all equivalents thereof.

What is claimed is:

1. A thermal detection system comprising at least two uninsulated, metal, power supply bus bars having a predetermined current limit connected to a plural pole circuit breaker which contains a shunt trip module, where each bus bar is contacted along at least part of its length with a resistance temperature detector adhesive tape strip that reacts to changes in temperature by changing its resistivity and where a heat detection measurement module is electrically connected to each resistance temperature detector adhesive tape strip, and to the shunt trip module, where the heat detection module is preset to allow current to energize the shunt trip module and shut down the circuit breaker if the temperature anywhere along the bus bar adhesive tape strip contact points is measured by the heat detection measurement module to be greater than the current limit preset; and wherein the heat detection measurement module is an electrical bridge circuit that comprises three open resistors and a variable resistor preset switch, with an associated voltage source.

* * * * *